(12) United States Patent
Weflen

(10) Patent No.: US 10,315,473 B2
(45) Date of Patent: Jun. 11, 2019

(54) TIRE DEFLATION APPARATUS AND METHOD

(71) Applicant: Darryl Weflen, Edmonton (CA)

(72) Inventor: Darryl Weflen, Edmonton (CA)

( * ) Notice: Subject to any disclaimer, the term of this patent is extended or adjusted under 35 U.S.C. 154(b) by 152 days.

(21) Appl. No.: 15/511,626

(22) PCT Filed: May 5, 2015

(86) PCT No.: PCT/CA2015/000297
§ 371 (c)(1),
(2) Date: Mar. 15, 2017

(87) PCT Pub. No.: WO2016/049734
PCT Pub. Date: Apr. 7, 2016

(65) Prior Publication Data
US 2017/0297388 A1    Oct. 19, 2017

Related U.S. Application Data

(60) Provisional application No. 62/059,735, filed on Oct. 3, 2014.

(51) Int. Cl.
| | |
|---|---|
| *G01M 17/02* | (2006.01) |
| *B60C 25/18* | (2006.01) |
| *B60C 23/10* | (2006.01) |

(52) U.S. Cl.
CPC ............. *B60C 25/18* (2013.01); *B60C 23/10* (2013.01); *G01M 17/02* (2013.01)

(58) Field of Classification Search
CPC .. G01M 17/02; G01M 17/021; G01M 17/022; G01M 17/027; G01M 17/025;
(Continued)

(56) References Cited

U.S. PATENT DOCUMENTS 5,180,456 A * 1/1993 Schultz ................. B60C 23/003
141/1
5,437,301 A * 8/1995 Ramsey .................. B60P 7/065
137/231
(Continued)

FOREIGN PATENT DOCUMENTS

| CA | 2243908 | 1/1999 |
|---|---|---|
| WO | WO2013063689 | 5/2013 |

OTHER PUBLICATIONS

Canadian Office Action dated Mar. 5, 2019 in related Application No. 2961071 filed Mar. 13, 2017 (4 pages).
(Continued)

*Primary Examiner* — Andre J Allen
(74) *Attorney, Agent, or Firm* — Dentons US LLP; Brian R. McGinley; Roman Tsibulevskiy

(57) ABSTRACT

An apparatus and method is provided for deflating an air-pressurized tire used on heavy machinery or mining equipment. The apparatus can include a venturi tube having a feed tube with one end terminated in the constricted throat of the venturi tube and the other end operatively connected to an exit port of a valve extraction tool connected to a valve stem disposed on the tire's rim. A stream of air can be passed through the throat of the venturi tube to create a region of pressure lower than atmospheric pressure. When the extraction tool removes the valve core of the valve stem, pressurized air in the tire can flow to the low-pressure region in the venturi tube thereby resulting in decreased time to deflate the tire.

16 Claims, 3 Drawing Sheets

(58) Field of Classification Search
CPC ...... G01M 17/024; G01M 17/10; G01M 7/08; G01M 17/0076; G01M 17/013; G01M 17/03; G01M 17/04; G01M 17/06; G01M 17/08; G01M 1/02; G01M 1/045; G01M 1/12; G01M 1/225; G01M 3/04; G01M 3/40; G01M 5/0091; G01M 7/02; G01M 99/00; G01M 99/002; B60C 23/0494; B60C 23/04; B60C 23/0493; B60C 2019/004; B60C 19/00; B60C 23/0498; B60C 23/064; B60C 23/0488; B60C 23/0496; B60C 23/0408; B60C 23/041; B60C 23/0411; B60C 23/20; B60C 11/243; B60C 11/246; B60C 23/06; B60C 23/061; B60C 23/00; B60C 23/0486; B60C 11/0083; B60C 13/003; B60C 2009/2038; B60C 23/003; B60C 23/004; B60C 23/02; B60C 23/0401; B60C 23/0406; B60C 23/0416; B60C 23/0433; B60C 23/0455; B60C 23/0489; B60C 23/0491; B60C 25/002; B60C 25/005; B60C 25/007; B60C 29/02; B60C 3/04; B60C 99/00; B60C 99/006; B60C 11/24; B60C 13/001; B60C 13/02; B60C 15/0036; B60C 17/02; B60C 2009/0071; B60C 2009/2022; B60C 2200/02; B60C 2200/06; B60C 2200/065; B60C 23/001; B60C 23/007; B60C 23/008; B60C 23/0413; B60C 23/0427; B60C 23/0447; B60C 23/0454; B60C 23/0459; B60C 23/0467; B60C 23/0471; B60C 23/0472; B60C 23/0474; B60C 23/0476; B60C 23/0484; B60C 23/065; B60C 23/066; B60C 23/10; B60C 25/0548; B60C 25/056; B60C 25/132; B60C 25/138; B60C 25/18; B60C 29/005; B60C 9/005; B60C 9/18; B60C 9/1807; B60C 9/20; B60C 9/28
USPC .................................................. 73/146–146.8
See application file for complete search history.

(56) References Cited

U.S. PATENT DOCUMENTS

| | | | | |
|---|---|---|---|---|
| 5,505,080 | A * | 4/1996 | McGhee | B60C 23/004 116/34 R |
| 6,053,222 | A | 4/2000 | Peters | |
| 6,561,017 | B1 * | 5/2003 | Claussen | B60C 23/003 73/146 |
| 6,894,607 | B1 * | 5/2005 | Claussen | B60C 23/003 137/225 |
| 7,320,347 | B2 | 1/2008 | Ramsey et al. | |
| 2018/0345740 | A1 * | 12/2018 | Vitolo | A61B 5/01 |
| 2018/0345741 | A1 * | 12/2018 | Vitolo | B60C 23/003 |

OTHER PUBLICATIONS

AirWorks, The "Cyclone" Tire Deflation & Inflation Tool, http://www.cyclonedeflator.com/wp-content/uploads/2018/12/cyclone_operating_instructions.pdf, downloaded from the Internet Apr. 2, 2019 (14 pages).
ALWITCO, Air Exhaust Muffler, http://www.alwitco.com/alwitco/our-products/atomuffler-series/air-exhaust-muffler.html, downloaded from the Internet Apr. 2, 2019 (1 page).

* cited by examiner

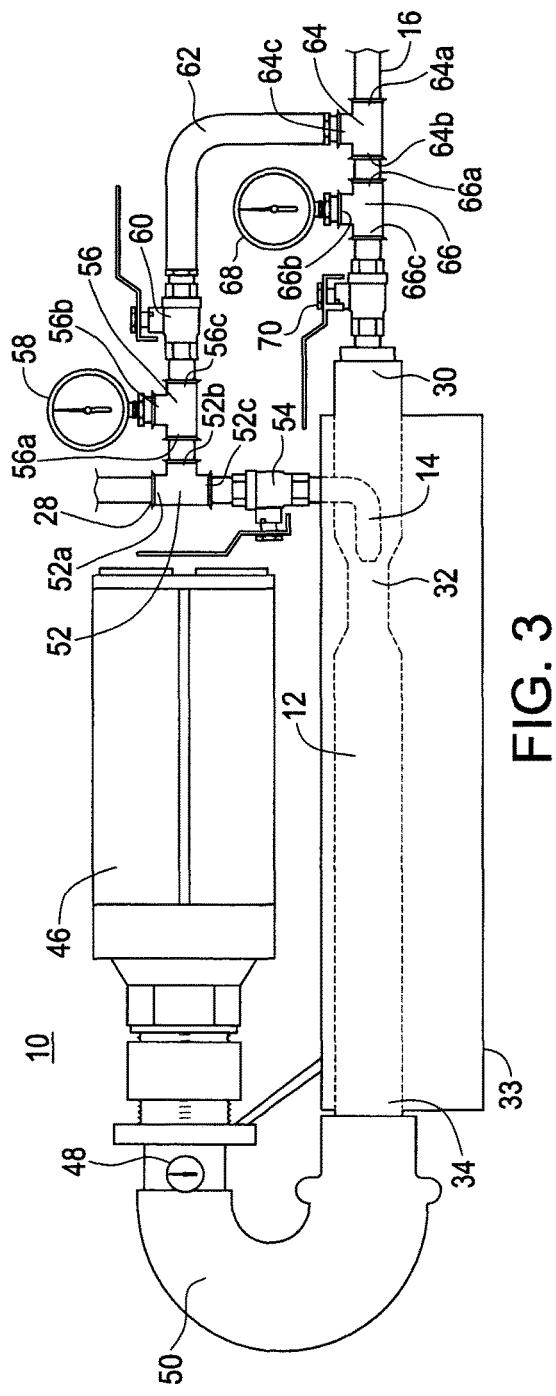
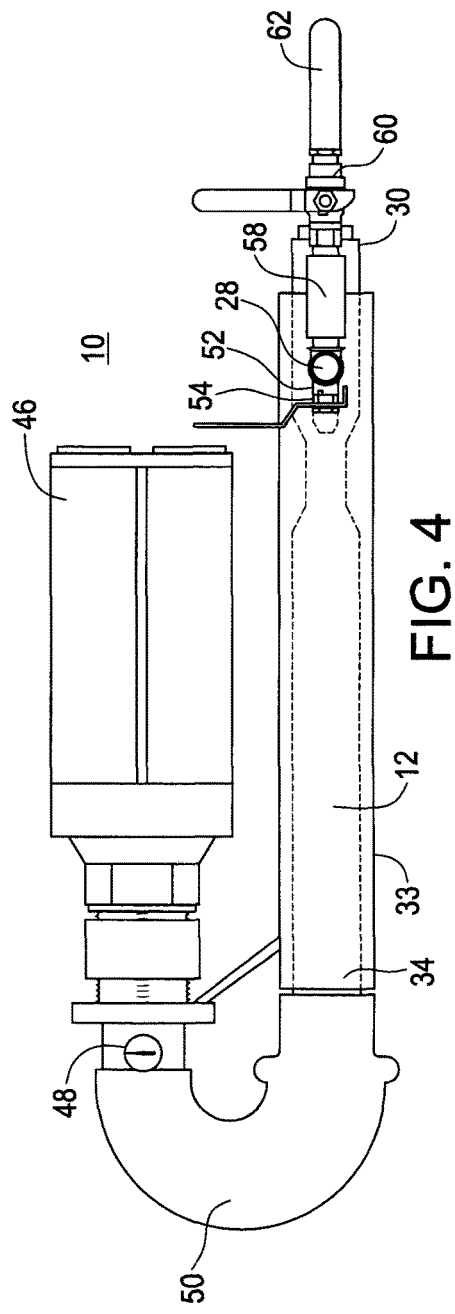

TIRE DEFLATION APPARATUS AND METHOD

CROSS-REFERENCE TO RELATED APPLICATIONS

This is the United States National Stage of Patent Cooperation Treaty Application No. PCT/CA15/000297 filed in the Canadian Intellectual Property Office on May 5, 2015. The application claims priority to U.S. Provisional Application Ser. No. 62/059,735, filed Oct. 3, 2014, the disclosures of which are hereby incorporated herein by reference in their entirety to the extent permitted by law.

TECHNICAL FIELD

The present disclosure is related to the field of apparatuses and methods for use in deflating air-pressurized tires, in particular, large diameter 10 tires used on heavy machinery and mining equipment.

BACKGROUND

Heavy machinery and equipment used in mining and other like industries often have large diameter tires, some as large as 10 feet in diameter or more, pressurized up to 110 psi or more, as well known to those skilled in the art. When a tire needs servicing, or when the machinery or equipment requires servicing where a tire must be removed first, the tire needs to be deflated before service personnel can perform the service work. If the tire is part of a dual-tire configuration, the tire requiring servicing needs to be deflated to a safe level, such as atmospheric pressure, before work can commence whereas the other tire of the dual configuration also needs to be deflated to a safe level although not all the way to atmospheric pressure. Industry practice dictates that a pressure level of 20 psi in the tire not being worked on in a dual configuration is sufficient to provide a safe environment for service personnel but maintains enough pressure in the tire not being worked on to prevent the bead seal of the tire on the rim from breaking loose, which can add time to the carrying out of the repairs or servicing.

To deflate such large tires, it is known to use a valve core extraction tool that attaches to the valve stem on the tire and permits the removal of the valve core, which is contained in the extraction tool. The extraction tool comprises an exit port that allows the pressurized air in the tire to escape through the exit port when the valve core is removed from the valve stem. The problem with this system is that the time deflate a 10 feet diameter tire having an operation pressure of 110 psi is, on average, 27 minutes or so to a safe pressure before service personnel can work on the tire. It is known that the rate of deflation is a function of the pressure differential between the internal tire pressure and atmospheric pressure. In other words, the rate of deflation is higher when the valve core is removed but as the air pressure in the tire decreases, the rate of deflation of the tire decreases. When the tire is used on mining equipment that generates revenue in the order of approximately $4,000.00 per hour, any unnecessary delay in the servicing of the equipment can result in large amounts of lost revenue for the mining operator.

It is, therefore, desirable to provide an apparatus and method for deflating tires that can decrease the deflation time of tires used on heavy machinery and mining equipment.

SUMMARY

A tire deflation apparatus and method is provided. In some embodiments, the apparatus can comprise a venturi tube having a feed tube positioned in a constricted throat of the tube, the feed tube connected to an exit port of a valve core extraction tool, a tool well known to those skilled in the art. In some embodiments, a stream of compressed air can be passed through an inlet of the venturi tube to the constricted throat of the venturi tube wherein a region of low pressure can be formed in the vicinity of the feed tube. When this occurs, a higher-pressure differential can be created between the internal tire pressure and the low-pressure region in the venturi tube, which can also increase the rate at which the tire deflates. In other words, the time to deflate the tire can decrease thereby decreasing the downtime of the equipment or machinery.

In some embodiments, the stream of compressed air can be connected to the feed tube and the tire can be connected to the inlet of the venturi tube wherein compressed air is introduced into the constricted throat and can draw air from the tire being deflated through the inlet.

For the purposes of this specification and the claims set out herein, the term "air" can comprise atmospheric air, any gas suitable for pressurizing vehicle tires as well known to those skilled in the art, or any combination thereof.

Broadly stated, in some embodiments, an apparatus can be provided for use with a valve core extraction tool for deflating an air-pressurized tire, the apparatus comprising: a venturi tube further comprising an inlet, a constricted throat and an outlet; a feed tube having first and second ends, the first end disposed in the constricted throat, the second end configured to operatively couple to an exit port disposed on the valve core extraction tool; and means for operatively coupling the second end to the exit port.

Broadly stated, in some embodiments, an apparatus can be provided for deflating an air-pressurized tire comprising a valve stem further comprising a valve core disposed therein, the apparatus comprising: a valve core extraction tool configured to operatively attach to the valve stem, the tool further configured to remove the valve core from the valve stem; a venturi tube further comprising an inlet, a constricted throat and an outlet; a feed tube having first and second ends, the first end disposed in the constricted throat, the second end configured to operatively couple to an exit port disposed on the valve core extraction tool; and means for operatively coupling the second end to the exit port.

Broadly stated, in some embodiments, the apparatus can further comprise a first hose configured to operatively couple the second end to the exit port.

Broadly stated, in some embodiments, the apparatus can further comprise means for coupling the inlet to a source of compressed air.

Broadly stated, in some embodiments, the coupling means can further comprise a second hose configured to operatively couple the inlet to the source of compressed air.

Broadly stated, in some embodiments, the source of compressed air can further comprise an air compressor.

Broadly stated, in some embodiments, the apparatus can further comprise an air pressure control system disposed between the feed tube and the coupling means.

Broadly stated, in some embodiments, the apparatus can further comprise a muffler operatively coupled to the outlet.

Broadly stated, in some embodiments, a method can be provided for deflating an air-pressurized tire disposed on a wheel rim using a valve core extraction tool comprising an exit port, the valve core extraction tool further configured for removing a valve core from a valve stem disposed on the rim, the method comprising the steps of: providing an apparatus, comprising: a venturi tube further comprising an inlet, a constricted throat and an outlet, and a feed tube having first and second ends, the first end disposed in the constricted throat, the second end disposed outside of the venturi tube; attaching the valve core extraction tool to the valve stem; operatively coupling the exit port to one of the inlet and the second end of the feed tube; passing a stream of compressed air through the other of the inlet and the second end of the feed tube; and removing the valve core from the valve stem with the valve core extraction tool wherein pressurized air disposed in the tire can pass through the venturi tube and exit therefrom via the outlet.

Broadly stated, in some embodiments, the method can further comprise the steps of: operatively coupling the exit port to the inlet; and operatively coupling the stream of compressed air to the second end of the feed tube.

Broadly stated, in some embodiments, the method can further comprise the step of reducing a sound pressure level of the air exiting the outlet.

Broadly stated, in some embodiments, an apparatus can be provided for deflating an air-pressurized tire disposed on a wheel rim using a valve core extraction tool comprising an exit port, the valve core extraction tool further configured for removing a valve core from a valve stem disposed on the rim, the apparatus comprising: a venturi tube further comprising an inlet, a constricted throat, an outlet, and a feed tube having first and second ends, the first end disposed in the constricted throat, the second end disposed outside of the venturi tube; means for attaching the valve core extraction tool to the valve stem; means for operatively coupling the exit port to one of the inlet and the second end of the feed tube; and means for passing a stream of compressed air through the other of the inlet and the second end of the feed tube.

Broadly stated, in some embodiments, the apparatus can further comprise means for reducing a sound pressure level of the air exiting the outlet.

Broadly stated, in some embodiments, the use of an apparatus in combination with a valve core extraction tool can be provided for deflating an air-pressurized tire disposed on a wheel rim, the valve core extraction tool comprising an exit port, the valve core extraction tool further configured for removing a valve core from a valve stem disposed on the rim, the apparatus comprising a venturi tube further comprising an inlet, a constricted throat, an outlet and a feed tube having first and second ends, the first end disposed in the constricted throat, the second end disposed outside of the venturi tube.

Broadly stated, in some embodiments, the use of an apparatus in combination with a valve core extraction tool can be provided for deflating an air-pressurized tire disposed on a wheel rim, the valve core extraction tool comprising an exit port, the valve core extraction tool further configured for removing a valve core from a valve stem disposed on the rim, the apparatus comprising a venturi tube further comprising an inlet, a constricted throat, an outlet, a feed tube having first and second ends, the first end disposed in the constricted throat, the second end disposed outside of the venturi tube and a muffler operatively coupled to the outlet.

BRIEF DESCRIPTION OF THE DRAWINGS

FIG. 1 is a block diagram depicting one embodiment of a tire deflation apparatus.

FIG. 3 is side elevation view depicting a third embodiment of a tire deflation apparatus.

FIG. 4 is a top plan view depicting an alternate embodiment of the apparatus of FIG. 3.

DETAILED DESCRIPTION OF EMBODIMENTS

Figure 1:
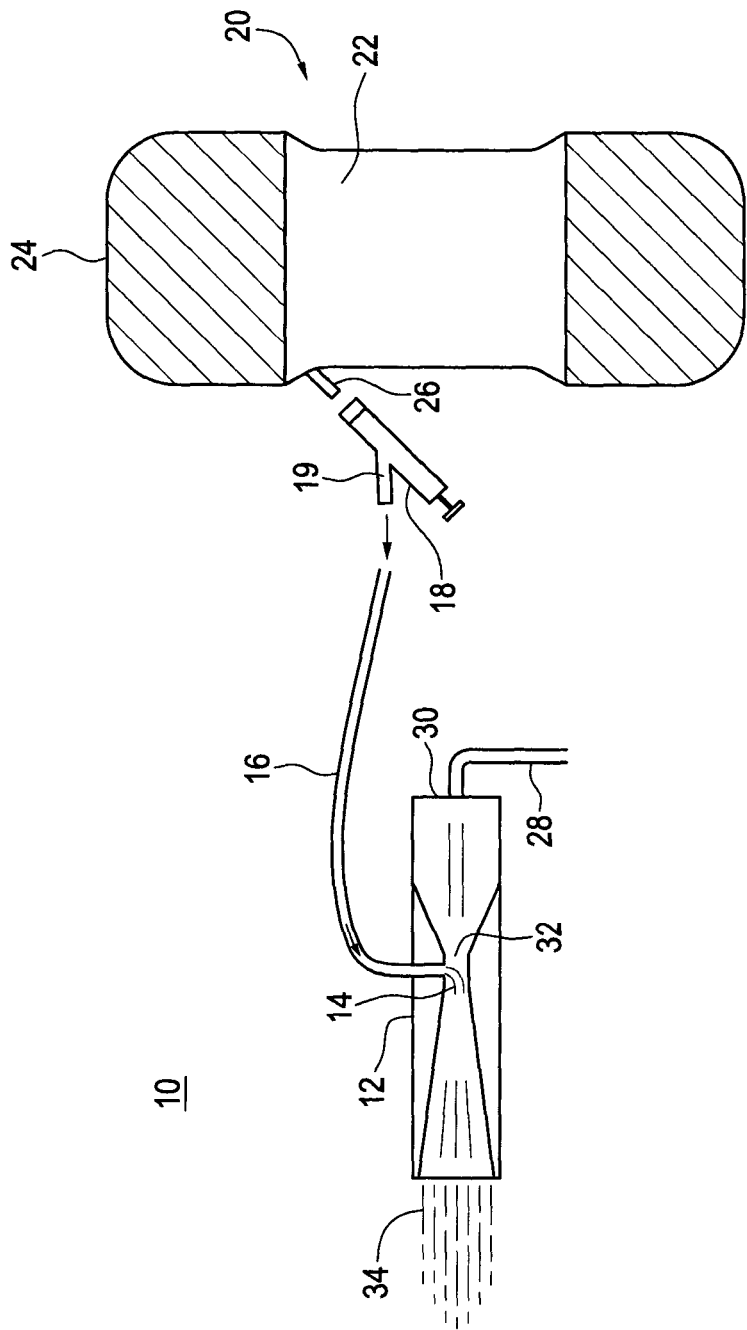
FIG. 1 is a side elevation view depicting

Referring to FIG. 1, one embodiment of apparatus 10 to deflate a tire is shown. In some embodiments, apparatus 10 can comprise venturi tube 12, further comprising one end of feed tube 14 disposed in constricted throat 32 of tube 12, wherein the other end of feed tube 14 can be configured to be connected to exit port 19 of valve core extraction tool 18 upon which, communication can be established between exit port 19 and throat 32. In some embodiments, hose 16 can be used to connect exit port 19 to feed tube 14. In some embodiments, apparatus 10 can comprise means for establishing a flow or stream of air through venturi tube 12. In some embodiments, the means can comprise hose 28 connecting a source of compressed air, such as from an air compressor (not shown) to inlet 30 of venturi tube 12. When extraction tool 18 is attached to valve stem 26 disposed on rim 22 of wheel 20, wherein tire 24 can be disposed thereon, and when hose 16 connects exit port 19 to feed tube 14, extraction tool 18 can be used to remove the valve core from valve stem 26. In so doing, pressurized air in tire 24 can exit through exit port 19 and pass through hose 16 and feed tube 14 into throat 32 of venturi tube 12. As compressed air from the compressor enters venturi tube 12 through inlet 30 via hose 28, a low pressure region can be created in throat 32 thereby resulting a pressure differential, as between the air pressure in tire 24 and throat 32 that can be greater than the pressure differential between the air pressure in tire 24 and atmospheric pressure.

In some embodiments, a method to deflate a tire can comprise the following steps. Extraction tool 18 can be attached to valve stem 26. Exit port 19 can be connected to feed tube 14. In some embodiments, hose 16 can be used to connect exit port 19 to feed tube 14. A stream of air can be passed through venturi tube 12 to create a region of low pressure in the vicinity of feed tube 14 disposed in constricted throat 32 before the air exits venturi tube 12 via outlet 34. In some embodiments, the stream of air can be provided from an air compressor (not shown) operatively connected to inlet 30 via hose 28. Extraction tool 18 can then be operated to remove the valve core from valve stem 26 to allow the pressurized air in tire 24 to pass through exit port 19 to throat 32 of venturi tube 12 via hose 16 and feed tube 14. As the pressure in throat 32 can be lower than atmospheric pressure, the rate of deflation of tire 24 can be greater than if exit port 19 is left unconnected thereby allowing pressurized air tire 24 to escape to the atmosphere.

Figure 2:
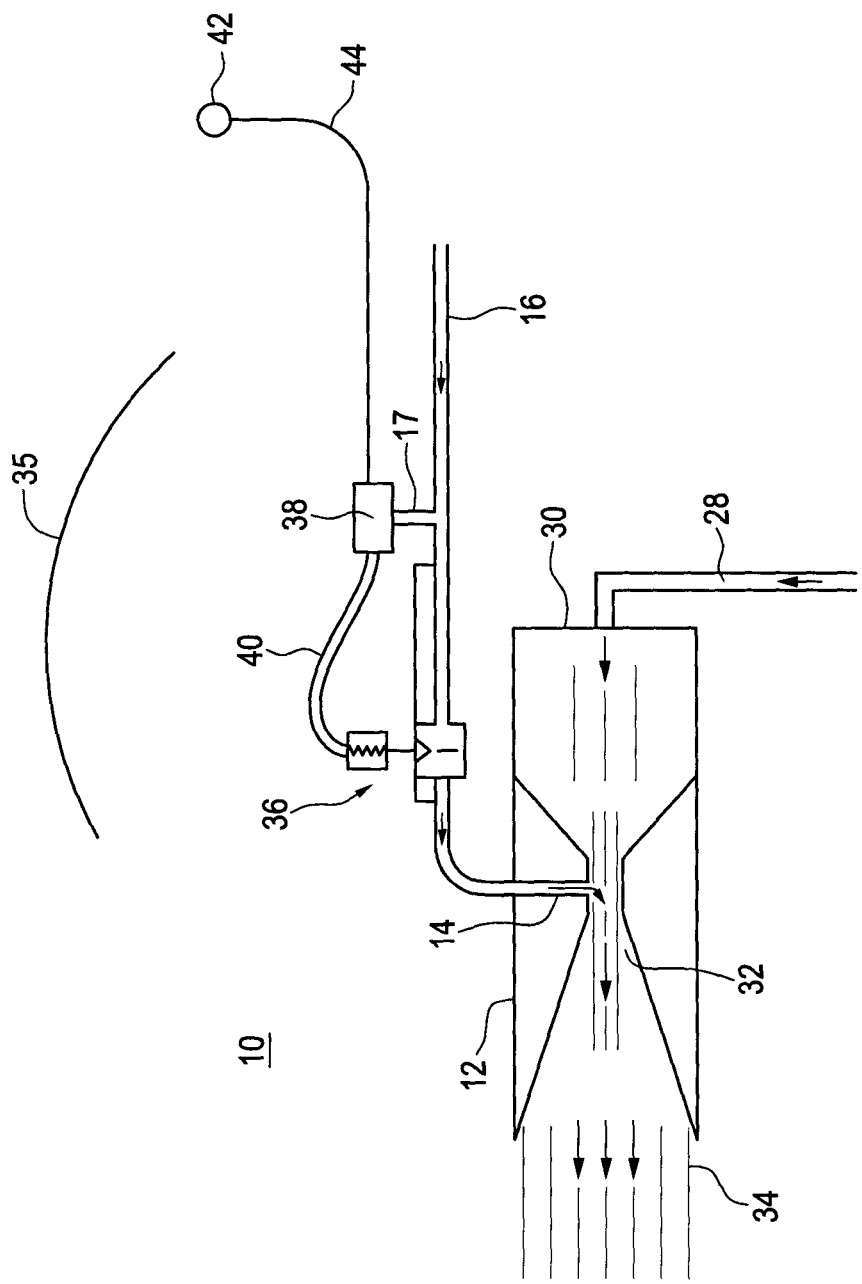
FIG. 2 is a block diagram depicting another embodiment of the apparatus of FIG. 1.

Referring to FIG. 2, another embodiment of apparatus 10 is shown. In this embodiment, apparatus 10 can further comprise air pressure control system 35. In some embodiments, system 35 can comprise air valve 36, as well known to those skilled in the art, disposed between hose 16 and feed tube 14. In further embodiments, valve 36 can comprise an electrical solenoid control mechanism to open and close valve 36. In some embodiments, valve 36 can be configured as a normally open valve, although it can be configured as a normally closed valve in other embodiments. In some embodiments, system 35 can further comprise pressure switch 38, as well known to those skilled in the art, operatively connected to valve 36 via control wires 40 wherein pressure switch 38 is operatively connected to line 16 via tee-line 17 to provide communication to pressurized air disposed in line 16. System 35 can further comprise activator switch 42 operatively connected to pressure switch 38 via control wires 44. In some embodiments, when system 35 is installed in apparatus 10, activator switch 42 can be used to operate apparatus 10 to start the deflation of a tire. In other embodiments, activator switch 42 can be used to simply activate pressure switch 38. In some embodiments, pressure switch 38 can monitor the air pressure in hose 16, and when the air pressure in hose 16 reaches a predetermined pressure, as set and/or configured on pressure switch 38, pressure switch 38 can then operate valve 36 to close. In operation, system 35 can be configured, in some embodiments, to enable apparatus 10 to deflate a tire to a predetermined air pressure, and then automatically stop the deflation process to prevent further depressurization of the tire. This can be useful in deflating one tire in a dual-tire configuration to a safe pressure, such as 20 psi, to allow service personnel to work on the other tire in the dual-tire configuration, as noted earlier in this specification. In some embodiments, apparatus 10 can be used to deflate the tire without service personnel having the monitor the pressure during the deflation process; apparatus 10 can be left unattended to deflate a tire until the air pressure in the tire reaches the predetermined air pressure as set or configured on pressure switch 38.

Referring to FIG. 3, another embodiment of apparatus 10 is illustrated. In this embodiment, venture tube 12 can be disposed in housing 33. In this embodiment, compressed air delivered through hose 28 to port 52a of tee 52 and pass through port 52c into valve 54 before entering into feed tube 14 to direct compressed air to throat 32 of venture tube 12. Port 52b permits compressed to enter into port 56a tee 56 that can be connected to pressure gauge 58 via port 56b to measure the pressure of the compressed air. Port 56c can connect to valve 60, which can further connect to port 64c of tee 64 via hose 62. Hose 16 from a tire (not shown) can connect to port 64a of tee 64. Port 64c can connect to port 66a of tee 66, which can have port 66b connected to pressure gauge 68 and further have port 66c connected to valve 70 that is further connected to inlet 30 of venture tube 12. In some embodiments, outlet 34 can be operatively connected to muffler 46 that can reduce the sound pressure level of the air exiting outlet 34 when deflating a tire to a safe sound pressure level or loudness. In further embodiments, elbow 50 can be disposed between outlet 34 and muffler 46 to bring muffler 46 in close to housing 33 and reduce the length of apparatus 10. In yet further embodiments, apparatus 10 can comprise restriction indicator 48 disposed between elbow 50 and muffler 46. Restriction indicator 48 can provide a visual indication when muffler 46 has become filled with any particulate matter that can increase the restriction of the flow of air through muffler 46 thus requiring maintenance, repair or replacement of muffler 46. In some embodiments, all of the hoses, tees, valves and gauges disposed in apparatus 10 can be ¾" in diameter, nominally, and have ¾" NPT fittings as well known to those skilled in the art. In some embodiments, muffler 46 can comprise an ALWITCO model M40 muffler as manufactured by Allied Witan Company of North Royalton, Ohio, United States.

In the operation of apparatus 10 to deflate a tire, valve 60 can be closed and valves 54 and 70 can be opened to allow compressed air to be directed into throat 32 through feed tube 14 and, thus, draw air from the tire through hose 16, tee 64, tee 66 and valve 70 into inlet 30. As the tire is being deflated, pressure gauge 68 can monitor the air pressure of the tire to provide a visual indication of when the tire has been sufficiently deflated. Both the compressed air and the air from the tire being deflated can exit through outlet 34 and muffler 46. Without muffler 46 in place, air exiting outlet 34 can have a sound pressure level of approximately 110 dB, A-weighted, which is an unsafe sound pressure level for service personnel not wearing any hearing protection. By including muffler 46, the sound pressure level of the air exiting outlet 34 can be reduced to approximately 78 dB, A-weighted, which allows service personnel to safely work in the vicinity of apparatus 10 without wearing any hearing protection.

With the inclusion of valves 54, 60 and 70, and tees 52, 56, 64 and 66, apparatus 10 can also be used to inflate a tire. To inflate the tire, valves 54 and 70 can be closed, and valve 60 can be opened, which will allow compressed air to flow from tee 52 through tee 56, valve 60, hose 62, tee 64 and through hose 16 to the tire. Pressure gauge 58 can monitor the air pressure from the air compressor and pressure gauge 68 can monitor the air pressure of the tire being inflated.

Referring to FIG. 4, apparatus 10 is shown with elbow 50 configured to place muffler 46 to one side of housing 33, whereas FIG. 3 has elbow 50 configured to place muffler 46 above housing 33. Apart from the different position of muffler 46 in FIGS. 3 and 4, the configuration of the other elements of apparatus 10 are the same.

In some embodiments, either or both of pressure gauges 58 and 68 can comprise analogue pressure gauges, or digital or electronic pressure gauges. In some embodiments, one or more of valves 54, 60 and 70 can comprise manually-operated ball valve mechanism, or can comprise solenoid-controlled valves that can enable the use of a computer or a programmable logic controller to automate the operation of tire deflation and inflation.

Although a few embodiments have been shown and described, it will be appreciated by those skilled in the art that various changes and modifications can be made to these embodiments without changing or departing from their scope, intent or functionality. The terms and expressions used in the preceding specification have been used herein as terms of description and not of limitation, and there is no intention in the use of such terms and expressions of excluding equivalents of the features shown and described or portions thereof, it being recognized that the invention is defined and limited only by the claims that follow.

I claim:

1. An apparatus for use with a valve core extraction tool for deflating and inflating an air-pressurized tire, the apparatus comprising:
   a) a venturi tube comprising an inlet, a constricted throat and an outlet;
   b) a feed tube having first and second ends, the first end disposed in the constricted throat, the second end configured to operatively couple to an exit port disposed on the valve core extraction tool;
   c) a first hose configured to operatively couple the second end to the exit port;
   d) a second hose configured to operatively couple the inlet to a source of compressed air;
   e) a first valve operatively coupling the first hose to the second end of the feed tube;
   f) a second valve operatively coupling the second hose to the inlet;
   g) a third hose configured to provide communication between the first hose and the second hose; and
   h) the third hose comprising a third valve, the third valve configured to turn off the communication between the first hose and the second hose, whereupon closing the first and second valves and opening the third valve provides communication from the source of compressed air to the tire thereby enabling inflation of the tire.

2. The apparatus as set forth in claim 1, wherein the first hose comprises a first pressure gauge configured to measure air pressure of the tire.

3. The apparatus as set forth in claim 1, wherein the source of compressed air comprises an air compressor.

4. The apparatus as set forth in claim 1, further comprising an air pressure control system disposed between the feed tube and the coupling means.

5. The apparatus as set forth in claim 1, further comprising a muffler operatively coupled to the outlet.

6. An apparatus for deflating and inflating an air-pressurized tire comprising a valve stem comprising a valve core disposed therein, the apparatus comprising:
  a) a valve core extraction tool configured to operatively attach to the valve stem, the valve core extraction tool configured to remove the valve core from the valve stem;
  b) a venturi tube comprising an inlet, a constricted throat and an outlet;
  c) a feed tube having first and second ends, the first end disposed in the constricted throat, the second end configured to operatively couple to an exit port disposed on the valve core extraction tool;
  d) a first hose configured to operatively couple the second end to the exit port;
  e) a second hose configured to operatively couple the inlet to a source of compressed air;
  f) a first valve operatively coupling the first hose to the second end of the feed tube;
  g) a second valve operatively coupling the second hose to the inlet;
  h) a third hose configured to provide communication between the first hose and the second hose; and
  i) the third hose comprising a third valve, the third valve configured to turn off the communication between the first hose and the second hose, whereupon closing the first and second valves and opening the third valve provides communication from the source of compressed air to the tire thereby enabling inflation of the tire.

7. The apparatus as set forth in claim 6, wherein the first hose comprises a first pressure gauge configured to measure air pressure of the tire.

8. The apparatus as set forth in claim 6, wherein the source of compressed air comprises an air compressor.

9. The apparatus as set forth in claim 6, further comprising an air pressure control system disposed between the feed tube and the coupling means.

10. The apparatus as set forth in claim 6, further comprising a muffler operatively coupled to the outlet.

11. A method for deflating and inflating an air-pressurized tire disposed on a wheel rim using a valve core extraction tool comprising an exit port, the valve core extraction tool configured for removing a valve core from a valve stem disposed on the rim, the method comprising:

a) providing an apparatus, comprising:
  i) a venturi tube comprising an inlet, a constricted throat and an outlet,
  ii) a feed tube having first and second ends, the first end disposed in the constricted throat, the second end disposed outside of the venturi tube and operatively coupled to an exit port disposed on the valve core extraction tool,
  iii) a first hose configured to operatively couple the second end to the exit port,
  iv) a second hose configured to operatively couple the inlet to a source of compressed air,
  v) a first valve operatively coupling the first hose to the second end of the feed tube,
  vi) a second valve operatively coupling the second hose to the inlet,
  vii) a third hose configured to provide communication between the first hose and the second hose, and
  viii) the third hose comprising a third valve, the third valve configured to turn off the communication between the first hose and the second hose, whereupon closing the first and second valves and opening the third valve provides communication from the source of compressed air to the tire thereby enabling inflation of the tire;
b) attaching the valve core extraction tool to the valve stem;
c) operatively coupling the exit port to one of the inlet and the second end of the feed tube;
d) passing a stream of compressed air through the other of the inlet and the second end of the feed tube; and
e) removing the valve core from the valve stem with the valve core extraction tool wherein pressurized air disposed in the tire passes through the venturi tube and exit therefrom via the outlet.

12. The method as set forth in claim 11, further comprising:
  operatively coupling the exit port to the inlet; and
  operatively coupling the stream of compressed air to the second end of the feed tube.

13. The method as set forth in claim 12, further comprising reducing a sound pressure level of the air exiting the outlet.

14. The method as set forth in claim 11, further comprising:
  installing the valve core in the valve stem with the valve core extraction tool;
  and
  inflating the tire.

15. The method as set forth in claim 12, further comprising:
  installing the valve core in the valve stem with the valve core extraction tool; and
  inflating the tire.

16. The method as set forth in claim 11, further comprising:
  reducing a sound pressure level of the air exiting the outlet.

* * * * *